United States Patent [19]

Novak

[11] 4,328,329
[45] May 4, 1982

[54] PROCESS FOR POLYMERIZING METHYL METHACRYLATE SYRUP USING A DUAL INITIATOR SYSTEM

[75] Inventor: Ernest R. Novak, Vienna, W. Va.

[73] Assignee: E. I. Du Pont de Nemours and Company, Wilmington, Del.

[21] Appl. No.: 215,450

[22] Filed: Dec. 11, 1980

[51] Int. Cl.$^3$ .......................... C08F 4/04; C08F 20/14
[52] U.S. Cl. .................................. 526/218; 525/260; 525/376; 526/329.7
[58] Field of Search ................ 525/260, 376; 526/218, 526/329.7

[56] References Cited

U.S. PATENT DOCUMENTS

| | | | |
|---|---|---|---|
| 2,632,758 | 3/1953 | Brothman | 260/89.5 |
| 3,380,980 | 4/1968 | Calkins et al. | 526/329.7 |
| 3,639,553 | 2/1972 | Sueda et al. | 264/90 |
| 3,872,197 | 3/1975 | Kato et al. | 264/40 |
| 3,966,693 | 6/1976 | Kato | 526/329.7 |
| 4,046,850 | 9/1977 | Kato et al. | 264/216 |
| 4,197,215 | 4/1980 | Dudinyak | 526/329.7 |

OTHER PUBLICATIONS

D. W. Wood et al., Processing Report, Plastics Engineering, May 1955, pp. 51–53.

Primary Examiner—Harry Wong, Jr.

[57] ABSTRACT

Polymerization of a methyl methylacrylate polymer syrup is carried out using a dual initiator system of tertiary $C_4$- or tertiary $C_5$-peroxyneodecanoate and 2,2'-azobis(isobutyronitrile).

3 Claims, No Drawings

PROCESS FOR POLYMERIZING METHYL METHACRYLATE SYRUP USING A DUAL INITIATOR SYSTEM

FIELD OF THE INVENTION

This invention relates to the polymerization of methyl methacrylate syrup, and more particularly to the use therein of selected polymerization initiators.

BACKGROUND

The manufacture of cast poly(methyl methacrylate) is an important industrial process. Casting of methyl methacrylate monomer containing some polymer, commonly referred to as syrup, had been carried out in cells prepared from plate glass, flexible gaskets and steel clips (see e.g., Encyclopedia of Polymer Science and Technology, Volume 1, pp. 276-279; Interscience Publishers, 1964). Since this type of process is slow, taking 16-170 hours, continuous processes have been developed, see e.g., U.S. Pat. Nos. 3,872,197 and 4,046,850. While the residence time in these continuous casting units is much shorter than in the cell casting operation, the expensive nature of these units make it desirable to increase the production rate as much as possible.

Many initiators have been disclosed for use in increasing the production rate of cast poly(methyl methacrylate) sheet. For cell casting, the following initiators are but a few examples; benzoyl peroxide and t-butyl hydroperoxide combinations in U.S. Pat. No. 2,632,758; a number of peroxide and azo initiators, with benzoyl peroxide and 2,2'-azobis (isobutyronitrile) being preferred in U.S. Pat. No. 3,639,553. For continuously cast sheet, U.S. Pat. No. 3,872,197 recites a large number of catalysts (column 7, lines 30-40), but only uses azobisbutyronitrile and azobisvaleronitrile in the examples. Similarly U.S. Pat. No. 4,046,850 recites a large number of initiators (column 4, lines 10-31) but only azobisisobutyronitrile, azobisdimethylvaleronitrile and lauryl peroxide are used in the Examples. The use of an initiator such as t-alkyl peroxyneodecanoate insures fast polymerization; but this initiator gives sheet with relatively high residual monomer. The less active azobisisobutyronitrile gives too low polymerization rates.

The use of other initiators, such as azobisdimethylvaleronitrile in large quantities allows fast production rates, but the cast sheet contains a number of voids, believed to be caused by nitrogen generated from the azo initiators. With other initiators, the rate of heat generation from polymerization is such that voids may be caused by the excessive temperature of the heat of polymerization. Attempts have been made to overcome these problems by use of peroxycarbonate initiators, as described in U.S. Pat. No. 4,211,742; however, some low molecular weight peroxycarbonates require extremely careful handling because of their rather unstable nature and the potentially violent explosion and fire accompanying their decomposition if allowed to warm even to room temperature. On the other hand, safer, higher molecular weight peroxycarbonates are more expensive on a molar basis; thus, will cost more to use in sheet casting.

In an attempt to overcome the above mentioned disadvantages of previously disclosed initiator systems, D. W. Wood, Plastics Engineering, May 1975, pp. 51-53, recommends the combined use of t-butyl peroxyneodecanoate and decanoyl peroxide. However, the last paragraph of this article states, "The resulting cured castings were hard and glasslike, and exhibited some cavities that could be attributed to shrinkage during polymerization of the material." An acrylic sheet containing cavities is undesirable. When Wood's experiments were repeated by applicant, the void formations were observed, and the unconverted monomer in the polymers was 8.9 and 11.4%. Good quality sheet should have less than 2% residual monomer.

It is desirable to have an initiator that will provide a fast production rate while at the same time permit production of sheet free of defects and relatively free of residual monomer.

SUMMARY OF THE INVENTION

The invention described herein achieves the aforestated goals by employing in the polymerization of methacrylate syrup, a mixture of selected polymerization initiators.

According to the present invention there is provided a process for preparing a methyl methacrylate polymer selected from the group consisting of methyl methacrylate homopolymer and copolymers of methyl methacrylate with $\alpha,\beta$-ethylenically unsaturated compounds which process comprises polymerizing a syrup containing 10-40% by weight of said methyl methyacrylate polymer in monomeric methyl methyacrylate, wherein the improvement comprises carrying out said polymerization in the presence of a mixture of polymerization initiators, consisting of a tertiary $C_4$- or tertiary $C_5$-peroxyneodecanoate and 2,2'-azobis(isobutyronitrile). The term $C_4$- represents butyl, while the term $C_5$- represents pentyl.

DESCRIPTION OF THE INVENTION

The starting syrup, i.e., polymer-in-monomer solution, is well known and can be prepared by any well known method. For example, the syrup can be made by heating a small amount of a polymerization initiator in a solution in the methacrylic ester, optionally in the presence of a chain transfer agent, at a suitable pressure and temperature. Heating is continued until the solution reaches a predetermined viscosity. Thereafter, the hot solution is cooled. More specifically, a syrup having a viscosity of 0.5-100 poises at 25° C. can be produced from methyl methacrylate by heating the monomeric methyl methacrylate in a jacketed kettle at a temperature of 50°-150° C. under refluxing conditions. Normally, atmospheric pressure is used, and the refluxing material is stirred. The heating is conducted in the presence of a very small amount of initiator. When the desired viscosity is attained, the polymerization is stopped by cooling the mixture in any suitable manner. Cooling can be by any conventional means. One method involves adding 1-10% by weight of cold methyl methacrylate containing sufficient hydroquinone or other polymerization inhibitor to inhibit further polymerization of the methyl methacrylate.

The syrup solution usually contains 10-40% by weight of the methyl methacrylate polymer dissolved in the methyl methacrylate monomer. The polymer ordinarily has an inherent viscosity of 0.35-1.0 determined at 20° C. using a solution of 0.50 gram of the polymer per 100 milliliters of methylene chloride. As mentioned previously, the polymer can also be a copolymer involving a major portion of the methyl methacrylate monomer with such monomers as vinyl acetate, styrene, methyl acrylate, ethyl acrylate, butyl acrylate, cyclohexyl acrylate, 2-ethylhexyl acrylate, acrylonitrile, ethyl methacrylate, butyl methacrylate, cyclohexyl methacrylate, 2-ethylhexyl methacrylate, methacrylonitrile, and the like.

The syrup is used to prepare cast methyl methacrylate articles, such as sheets, by either cell or continuous processes. For casting, temperature of 60-90° C. are usually employed, and for post curing, temperatures of 120°-140° C. are used. Pressure employed during casting is usually autogenous pressure.

The initiator system which comprises the improvement described herein, is a mixture of tertiary-alkyl peroxyneodecanoate where the alkyl group is $C_4$ or $C_5$ (APN) and azobisisobutyronitrile (AIBN). The concentration of these initiators is preferably between 0.3-12 moles APN and between 0.1-4 moles AIBN in one million g of syrup. The concentration of initiator used is dependent upon the thickness of the cast sheet produced. Thicker sheet being toward the lower end of the above range while thinner sheet toward the middle of the range. For thermoformable crosslinked sheet, such as those described in U.S. Pat. No. 4,152,506, higher amounts are used.

For thermoformable sheets, chain transfer agents and crosslinking agents are employed.

The chain transfer agent can be a mercaptan, e.g., alkyl mercaptans of up to 20 carbon atoms, especially n-alkyl mercaptans of between about 4 and 20 carbon atoms, or aryl mercaptans in which the aryl group can be phenyl or naphthayl and which can contain alkyl (of 1-12 carbon atoms) or halogen (Cl, Br, I) substituents; polyhaloalkanes (preferably of 1-5 carbon atoms); phosphines such as $R_2PH$ or $RPH_2$ wherein R is aryl of 6-10 carbon atoms, or alkyl of 1-10 carbon atoms.

The crosslinking agent can be any organic compound that is copolymerizable with the methyl methacrylate monomer and which contains at least two ethylenically unsaturated double bonds, e.g., a diacrylate or dimethacrylate, such as the alkylene or hydroxy substituted alkylene diacrylates or dimethacrylate, e.g., 1,2-ethylene dimethacrylate or 1,6-hexanediol dimethylacrylate.

In addition, UV stabilizers, thermal stabilizers, dyes and pigments may be added.

EXAMPLES

Preparation of Syrup

Methyl methacrylate monomer was partially polymerized by heating at between 80°-100° C. in the presence of 2,2'-azobis(2,4-dimethylvaleronitrile) initiator. Polymerization was halted after about 5 to 35 minutes of heating at the aforesaid temperature range, until about 24% solids content was obtained.

Preparation and Initiator Solution

Initiator solutions were prepared by dissolving weighed amounts of initiators in methyl methacrylate monomer. The amount of initiator in the initiator solution was adjusted so that when 5 ml. of initiator solution was added to 95 or 100 g. of syrup, the resulting casting syrup contained the desired moles of initiators.

Addition of Initiator Solution to Syrup

The initiator solution was mixed with the syrup at room temperature in the desired concentration. Small amounts of a UV stabilizer, a thermal stabilizer and a prepolymerization inhibitor, were added to the syrup also.

Casting of Syrup

The syrup was deaerated under vacuum to remove volatiles, and then cast in casting cells prepared from stainless steel plates, steel clips, and flexible vinyl gaskets of the appropriate size to give sheet of desired thickness. The time to peak, i.e., the time for the syrup to reach about 80% conversion of monomer to polymer, was determined via a 1/16" thermocouple inserted into the syrup through the gasket. The casting cells were immersed in a water bath, and kept there about two minutes after the peak. The cell was removed from the water bath, the water was allowed to drain off the cell for 30 seconds, then the casting was placed in a glycol bath. After removal from the glycol bath, the casting was allowed to cool. The amount of unreacted methyl methacrylate present in the cast sheet was measured by gas chromatography. Inherent viscosities (I.V.) were measured in methylene chloride at 25° C.; 0.5 g. polymer per 100 ml. solution.

In Examples 1 and 2 and Controls A-D which follow, water bath temperature was 83° C., the cast sheets were 0.14" thick, glycol bath temperature was about 130° C. (varied from 129°-135° C.) and the time the cast sheets were in the glycol bath was 4 minutes.

The cast sheet in Examples 1-3 and Controls A-D was prepared as described further above using the syrup and initiator solution described above. Table I following, provides the amount of initiator present, time to peak (to indicate fastness or rate of the polymerization), % residual monomer present in the cast sheet (% MMA) inherent viscosity (I.V.) of the cast sheet, and the glycol bath temperature employed.

TABLE I

| Example (number) or Control (letter) | Initiators moles present | | | | Minutes to Peak | % MMA | I.V. |
|---|---|---|---|---|---|---|---|
| | APN[1] | AIBN[2] | ADMVN[3] | Other Initiators | | | |
| 1 | 3.19 | 0.62 | 0 | 0 | 17.8 | 1.43 | 1.677 |
| A | 3.22 | 0 | 0 | 0 | 17.8 | 2.39 | 1.693 |
| B | 0 | 0 | 2.01 | 0 | 19.8 | 1.58 | 1.703 |
| 2 | 3.22 | 0.48 | 0 | 0 | 17.4 | 1.15 | 1.647 |
| C | 3.19 | 0 | 0 | 0.45 BPO[4] | 17.2 | 2.29 | 1.527 |
| D | 3.20 | 0 | 0 | 0.4 SAP[5] | 19.0 | 13.2 | — |

[1] APN = t-butyl peroxyneodecanoate
[2] AIBN = 2,2'-azobisisobutyronitrile
[3] ADMVN = 2,2'-azobis(2,4 dimethylvaleronitrite)
[4] BPO = benzoyl peroxide
[5] SAP = succinic acid peroxide Comparison of Control A with Example 1 shows that while the polymerization rate was about the same, residual MMA monomer content was higher in Control A. Control B shows that with ADMVN initiator, residual MMA monomer content level was fair, but polymerization rate was slow.

Comparison of Example 2 with Controls C and D shows that with other initiator combinations, residual MMA monomer content was high, and in the case of Control D, polymerization rate was slow.

Considering Examples 1 and 2 with Controls A–D, the advantage of employing a mixture of APN and AIBN is apparent.

I claim:

1. A process for preparing a methyl methacrylate homopolymer and copolymers of methyl methacrylate with $\alpha,\beta$-ethylenically unsaturated compounds which process comprises polymerizing a syrup containing 10–40% by weight of said methyl methacrylate homopolymer or copolymer in monomeric methyl methacrylate, wherein the improvement comprises carrying out said polymerization in the presence of a mixture of polymerization initiators, consisting of between about 0.3–12 moles tertiary $C_4$- or tertiary $C_5$-peroxyneodecanoate and between about 0.1–4 2,2'-azobis-(isobutyronitrile) per 1 million grams of syrup.

2. The process of claim 1 wherein the methyl methacrylate homopolymer or copolymer in the syrup is methyl methacrylate homopolymer.

3. The process of claims 1 or 2 wherein the peroxyneodecanoate is tertiary $C_4$-peroxyneodecanoate.

* * * * *